(12) United States Patent
Demirdjian et al.

(10) Patent No.: US 8,135,511 B2
(45) Date of Patent: Mar. 13, 2012

(54) ELECTRONIC CONTROL SYSTEM, ELECTRONIC CONTROL UNIT AND ASSOCIATED METHODOLOGY OF ADAPTING A VEHICLE SYSTEM BASED ON VISUALLY DETECTED VEHICLE OCCUPANT INFORMATION

(75) Inventors: David Demirdjian, Somerville, MA (US); Chenna K. Varri, Quincy, MA (US); Danil Prokhorov, Canton, MI (US)

(73) Assignee: Toyota Motor Engineering & Manufacturing North America (TEMA), Erlanger, KY (US)

(*) Notice: Subject to any disclaimer, the term of this patent is extended or adjusted under 35 U.S.C. 154(b) by 373 days.

(21) Appl. No.: 12/408,383

(22) Filed: Mar. 20, 2009

(65) Prior Publication Data

US 2010/0241309 A1 Sep. 23, 2010

(51) Int. Cl.
*G06F 7/00* (2006.01)
(52) U.S. Cl. ................. 701/36; 701/37; 701/38; 701/45
(58) Field of Classification Search ................... 701/36, 701/37, 38, 45
See application file for complete search history.

(56) References Cited

U.S. PATENT DOCUMENTS

| 4,625,329 | A | 11/1986 | Ishikawa et al. | |
|---|---|---|---|---|
| 5,829,782 | A | 11/1998 | Breed et al. | |
| 6,450,530 | B1 | 9/2002 | Frasher et al. | |
| 6,704,114 | B1 | 3/2004 | Poechmuller | |
| 7,050,606 | B2 | 5/2006 | Paul et al. | |
| 7,194,346 | B2 | 3/2007 | Griffin et al. | |
| 7,299,119 | B2 * | 11/2007 | Sugiura | 701/45 |
| 7,359,527 | B2 | 4/2008 | Breed et al. | |
| 7,366,602 | B2 * | 4/2008 | Xu et al. | 701/70 |
| 7,370,883 | B2 * | 5/2008 | Basir et al. | 280/735 |
| 7,372,977 | B2 | 5/2008 | Fujimura et al. | |
| 7,406,181 | B2 * | 7/2008 | O'Boyle et al. | 382/104 |
| 7,415,126 | B2 | 8/2008 | Breed et al. | |
| 7,636,479 | B2 * | 12/2009 | Luo et al. | 382/224 |
| 2003/0125855 | A1 * | 7/2003 | Breed et al. | 701/36 |
| 2004/0220705 | A1 * | 11/2004 | Basir et al. | 701/1 |
| 2005/0140127 | A1 | 6/2005 | Nakajima | |
| 2007/0055428 | A1 * | 3/2007 | Kong et al. | 701/45 |
| 2008/0116680 | A1 | 5/2008 | Mita et al. | |
| 2008/0228358 | A1 | 9/2008 | Wang et al. | |
| 2008/0246318 | A1 | 10/2008 | Bothe et al. | |

FOREIGN PATENT DOCUMENTS

| EP | 0 582 735 | 2/1994 |
|---|---|---|
| JP | 58-138200 | 8/1983 |
| JP | 2002-331816 | 11/2002 |
| JP | 2005-41289 | 2/2005 |

OTHER PUBLICATIONS

U.S. Appl. No. 12/569,182, filed Sep. 29, 2009, Demirdjian.

* cited by examiner

*Primary Examiner* — Toan To
(74) *Attorney, Agent, or Firm* — Oblon, Spivak, McClelland, Maier & Neustadt, L.L.P.

(57) ABSTRACT

An electronic control system, electronic control unit and an associated methodology for adapting a vehicle system are provided. A visual sensor detects a three dimensional profile of an occupant of a vehicle. An electronic control unit determines at least one of three dimensional locations and orientations of a plurality of body parts of the occupant of the vehicle, a body-volume of the occupant of the vehicle and body dynamics of the occupant of the vehicle based on the three dimensional profile detected by the visual sensor. The electronic control unit adapts a vehicle system based on at least one of the determined three dimensional locations and orientations, the determined body-volume and the determined body dynamics.

17 Claims, 9 Drawing Sheets

ELECTRONIC CONTROL SYSTEM, ELECTRONIC CONTROL UNIT AND ASSOCIATED METHODOLOGY OF ADAPTING A VEHICLE SYSTEM BASED ON VISUALLY DETECTED VEHICLE OCCUPANT INFORMATION

BACKGROUND

An electronic control system, electronic control unit and associated methodology are provided. More particularly, an electronic control system, electronic control unit and associated methodology are provided to adapt a vehicle system based on visually detected vehicle occupant information.

It is known to employ sensors within vehicles to identify passenger occupancy. Such sensors typically include weight sensors that estimate passenger occupancy in order to control airbag deployment. Other systems utilize cameras to determine the presence or absence of a vehicle occupant within a vehicle seat.

However, these systems do not estimate a body-pose or body-volume of an occupant in order to adapt vehicle systems for improved comfort, safety and vehicle control.

SUMMARY OF EXEMPLARY ASPECTS OF THE ADVANCEMENTS

In one aspect, an electronic control system is provided for adapting a vehicle system. The electronic control system includes a visual sensor and an electronic control unit. The visual sensor detects a three dimensional profile of an occupant of a vehicle. The electronic control unit is configured to determine at least one of three dimensional locations and orientations of a plurality of body parts of the occupant of the vehicle, a body-volume of the occupant of the vehicle and body dynamics of the occupant of the vehicle based on the three dimensional profile detected by the visual sensor. The electronic control unit is further configured to adapt a vehicle system based on at least one of the determined three dimensional locations and orientations, the determined body-volume and the determined body dynamics.

In another aspect, a method for adapting a vehicle system is provided. The method includes detecting a three dimensional profile of an occupant of a vehicle with a visual sensor. At least one of three dimensional locations and orientations of a plurality of body parts of the occupant of the vehicle, a body-volume of the occupant of the vehicle and body dynamics of the occupant of the vehicle are determined based on the three dimensional profile detected by the visual sensor. A vehicle system is then adapted based on at least one of the determined three dimensional locations and orientations of the plurality of body parts of the occupant of the vehicle, the determined body-volume of the occupant of the vehicle and the determined body dynamics of the occupant of the vehicle.

In a further aspect, an electronic control unit for adapting a vehicle system is provided. The electronic control unit includes a data acquisition interface, a data processor, and a control interface. The data acquisition interface is configured to receive a three dimensional profile of an occupant of a vehicle. The data processor is configured to determine at least one of three dimensional locations and orientations of a plurality of body parts of the occupant of the vehicle, a body-volume of the occupant of the vehicle and body dynamics of the occupant of the vehicle based on the three dimensional profile. The control interface is configured to send signals that adapt a vehicle system based on at least one of the determined three dimensional locations and orientations, the determined body-volume and the determined body dynamics.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Certain terminology used in the following description is for convenience only and is not limiting. The term "body part" as used herein refers to any element of the human body that exhibits at least one degree of freedom relative to adjacent body elements. For example, this may include, but is not limited to, the arms, forearms, hands, fingers, head, torso, legs, or feet.

I. System

A system in accordance with an exemplary aspect of the disclosure is a vision-based system that estimates passenger distribution for optimal vehicle adaptation in order to improve comfort, safety and vehicle control. In particular, in the present example, visual sensors are utilized to detect the three dimensional ("3D") location of a plurality of body parts of the occupants of a vehicle (the vehicle operator(s) and/or vehicle passengers). In addition, contact sensors, such as weight or pressure sensors, can be used to detect the presence and/or weight of any vehicle occupants. Based on the detected values, the system determines occupant information such as, for example, the position, height, weight, body-volume, body-pose and body dynamics (velocity/acceleration) of a vehicle occupant.

The occupant information is then utilized to improve passenger comfort and safety by adapting a variety of vehicle systems. For example, the system may: adapt the vehicle suspension system based on a passenger's occupancy and their weight, reduce inadvertent airbag deployment (by using redundant information from this system in combination with the detection systems), adapt climate control systems within the vehicle to optimize in-vehicle ambient temperature, optimize and enhance sound distribution inside the vehicle by adjusting an in-vehicle sound-system, and alter seat alignment and positioning as well as automatically adjust seat-belt height based on a passenger's body dimensions.

Figure 1:
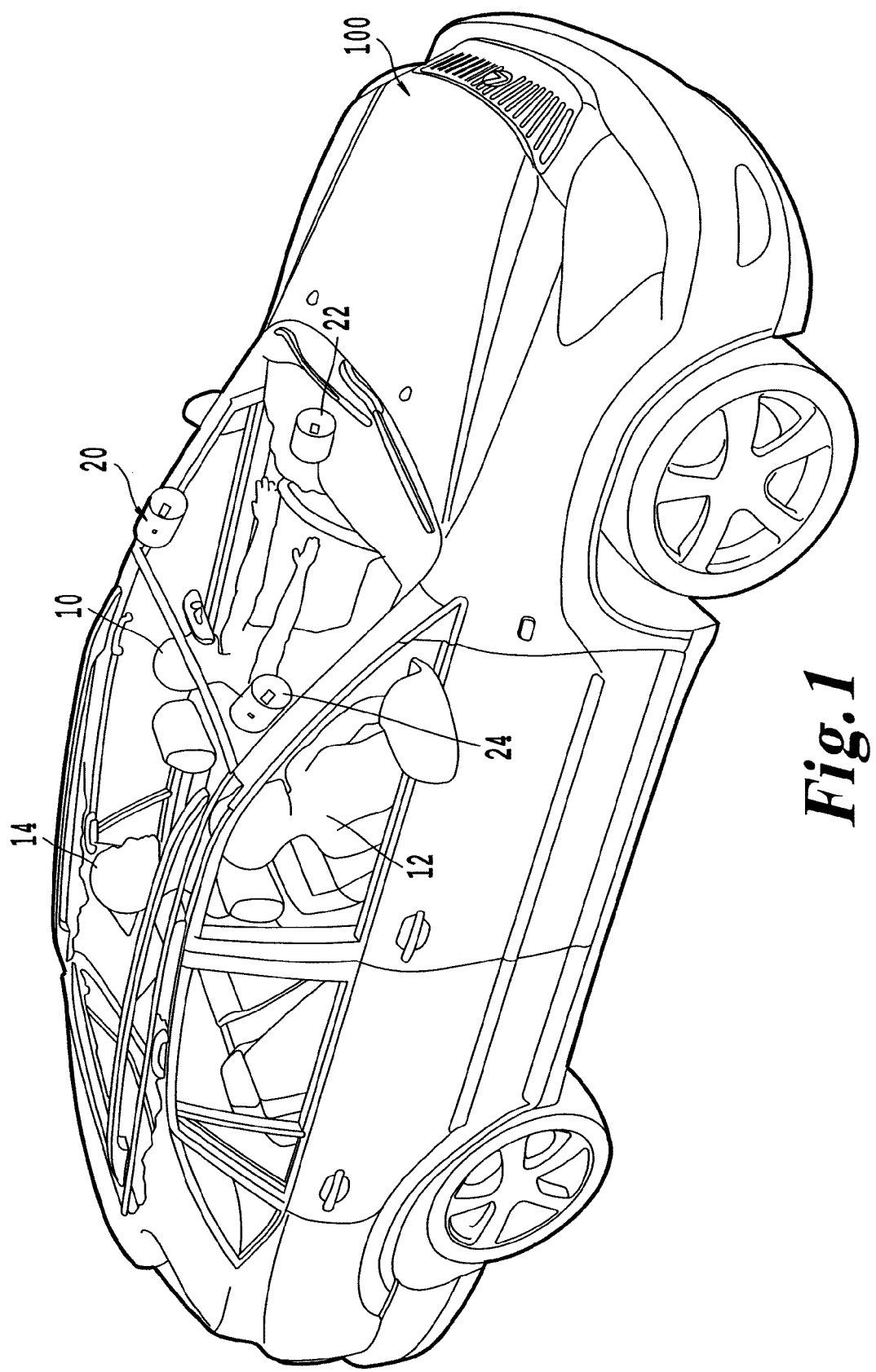
FIG. 1 illustrates a vehicle that includes visual sensors in accordance with an exemplary aspect of the disclosure.

Referring now to the drawings, wherein like reference numerals designate identical or corresponding parts throughout the several views, FIG. 1 illustrates a vehicle 100 that includes a system in accordance with an exemplary aspect of the disclosure. In FIG. 1, the vehicle 100 is operated by a vehicle occupant 10. Vehicle occupants 12 and 14 are passengers in vehicle 100. Throughout the disclosure, the system of the present invention is described with reference to the exemplary vehicle 100. However, as will be readily apparent to those of ordinary skill in the art, the system of the present invention can also be adapted to other types of vehicles, including public transportation vehicles such as trains and busses.

The vehicle 100 illustrated in FIG. 1 further includes visual sensors 20, 22 and 24. The visual sensors 20, 22 and 24 can be, for example, 3-D cameras that operate on the time-of-flight principle. For example, a 3-D camera can include an internal lighting source that emits Near-Infrared light which is back-scattered to a sensor in the camera by objects in the vehicle. The time of arrival can then be measured independently by each of a plurality of a sensor pixels within the camera. Based on this information, a complete distance map of all objects in the field of view can be obtained on a pixel-by-pixel basis, where each pixel (X, Y) constitutes a 3-D point M=(X, Y, Z) in a real-world coordinate system with the sensor at the origin.

However, other visual sensors that detect three dimension information can be used, and the visual sensors 20, 22 and 24 need not be limited to the above-described configuration. Moreover, although three visual sensors are illustrated in FIG. 1, the present invention can be performed by one or a plurality of visual sensors.

As noted above, the system utilizes passenger occupancy and body-volume information that is estimated using vision-based technology along with information from contact sensing technology. The system then applies this occupant information to enhance passenger comfort and experience inside the vehicle.

Figure 2A:
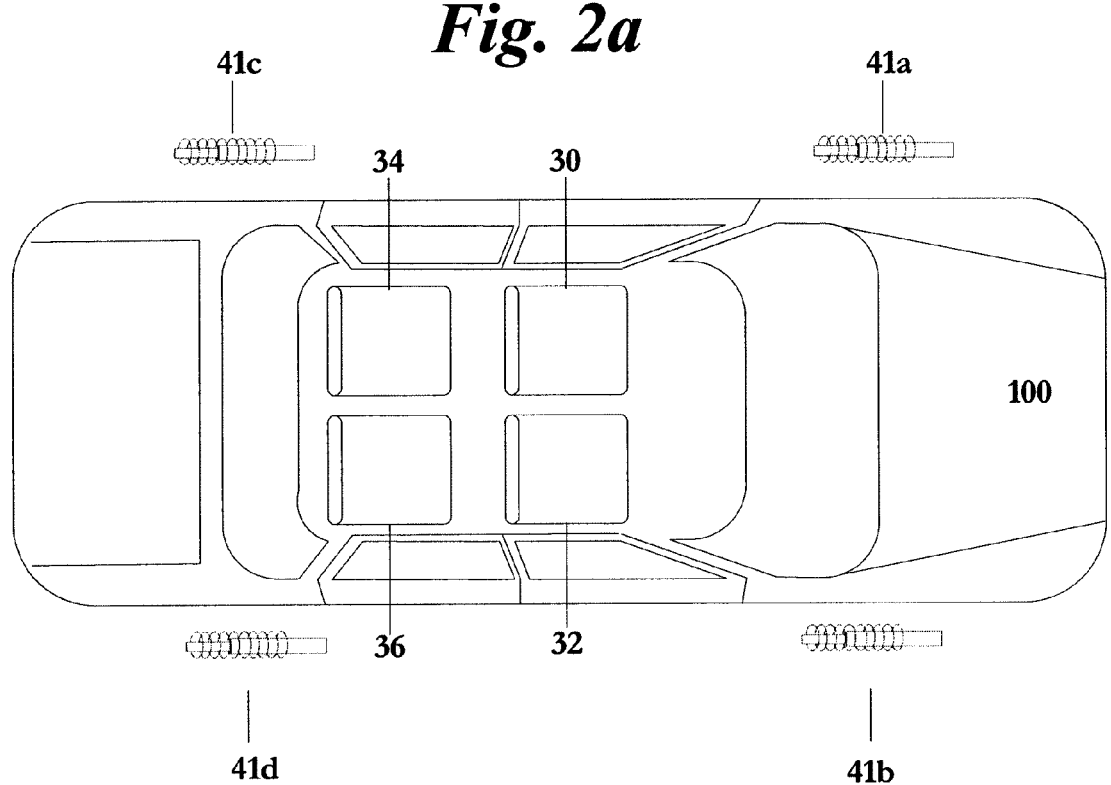
FIGS. 2a and 2b illustrate a suspension system of a vehicle in accordance with an exemplary aspect of the disclosure.
Figure 2B:
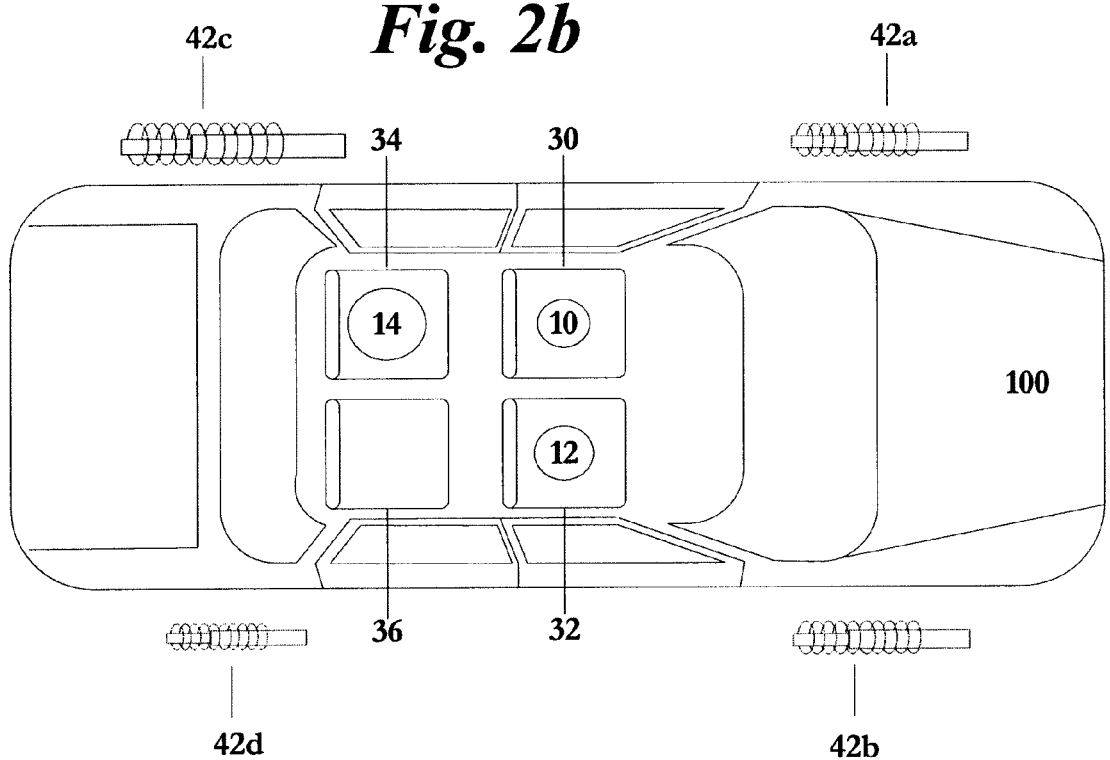

FIGS. 2a and 2b illustrate a vehicle suspension system of the vehicle 100 in accordance with an exemplary aspect of the present disclosure. The vehicle 100 includes two front seats 30 and 32 and two rear seats 34 and 36. The seats 30, 32, 34 and 36 are unoccupied in FIG. 2a. In FIG. 2b, vehicle occupants 10, 12 and 14 are respectively seated in vehicle seats 30, 32 and 34. In the present example, vehicle occupant 14 is larger in stature and mass than vehicle occupants 10 and 12.

Elements 41a, 41b, 41c and 41d in FIG. 2a represent suspension control amounts for each of the four wheels of the vehicle 100 when there are no occupants in the vehicle 100. Elements 42a, 42b, 42c and 42d in FIG. 2b represent suspension control amounts for each of the four wheels of the vehicle 100 when vehicle occupants 10, 12 and 14 are respectively seated in vehicle seats 30, 32 and 34 of the vehicle 100. Suspension control in the present example can include active or semi-active suspension control. Examples of active suspension control include, but are not limited to, hydraulically actuated suspensions or electromagnetically recuperative suspensions.

In the present example, the system detects the location and body dimensions of vehicle occupants 10, 12 and 14, and then estimates, for example, the volumetric information of each vehicle occupant (the occupant's body-volume). The respective estimated body-volumes can then be used to enhance the vehicle suspension in order to counter breaking, acceleration and cornering effects. For example, FIG. 2a illustrates the suspension control amount applied to the wheel closest to the vehicle occupant 14 (suspension control amount 42c) is greater than the suspension controls respectively applied to the wheels closest to the vehicle occupants 10 and 12 (suspension control amounts 42a and 42b) in order to accommodate for the larger stature and mass of the vehicle occupant 14. Although the suspension is controlled in this example based on the estimated body-volume of the vehicle occupants, the system can also control the suspension system based on other occupant information estimated based on the values detected by at least one visual sensor. For example, the suspension system could be controlled based on for example, the position, height, weight, body-pose and body dynamics (velocity/acceleration) of a vehicle occupant, or any combination thereof.

Figure 3A:
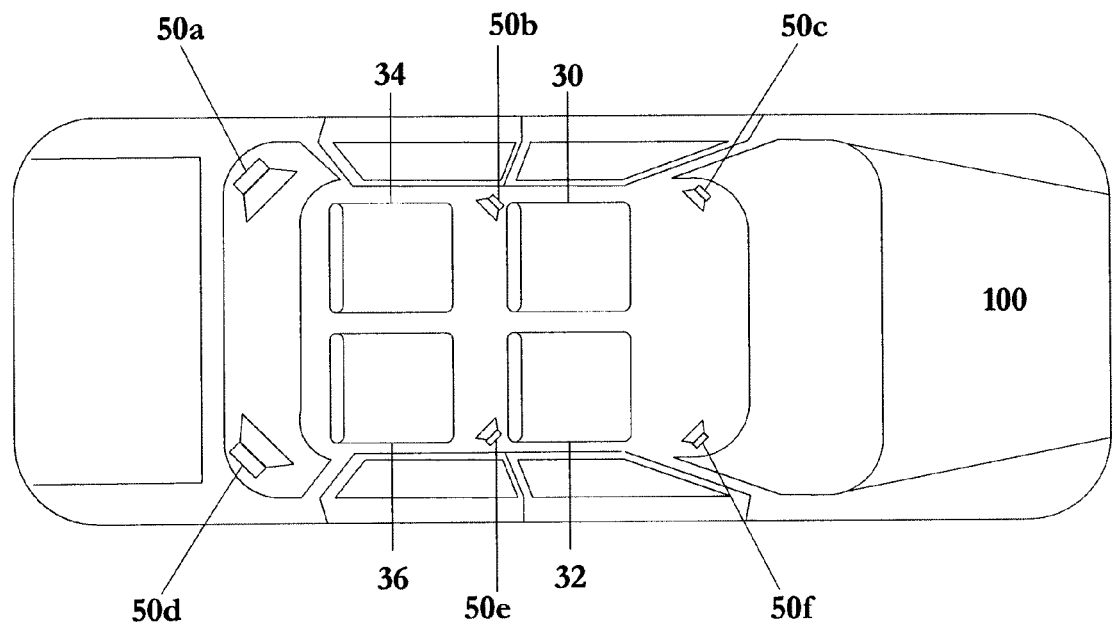
FIGS. 3a and 3b illustrate a sound distribution system in a vehicle in accordance with an exemplary aspect of the disclosure.
Figure 3B:
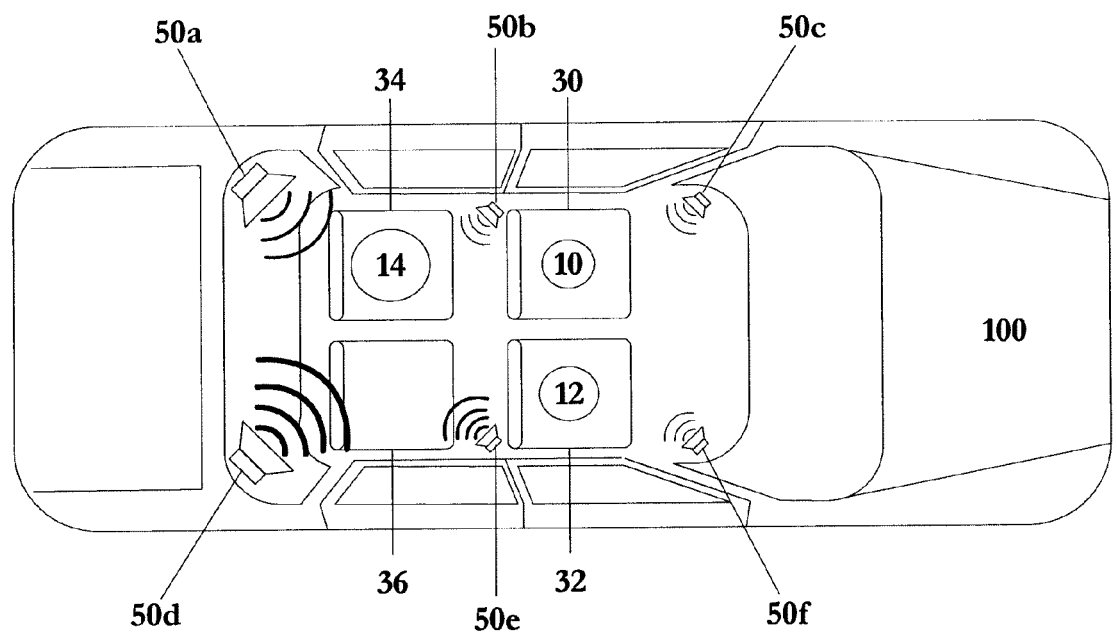

The system can also be utilized to optimize distribution of sound from an in-vehicle sound-system in order to improve vehicle occupant comfort while also mitigating energy losses. FIGS. 3a and 3b illustrate an in-vehicle sound-system of the vehicle 100 in accordance with an exemplary aspect of the present disclosure. The in-vehicle sound-system includes speakers 50a to 50f. In FIG. 3b, vehicle occupants 10, 12 and 14 are respectively positioned in seats 30, 32 and 34. The system detects the location and body dimensions of vehicle occupants 10, 12 and 14, and then performs at least one of the above noted estimations (occupant body-volume, occupant pose, occupant dynamics, etc.). The vehicle sound system is then adjusted to optimize distribution of sound. For example, as can be seen in FIG. 3b, the sound provided by speakers 50d and 50e is greater than the sound provided by the other speakers in the in-vehicle sound system.

Figure 4A:
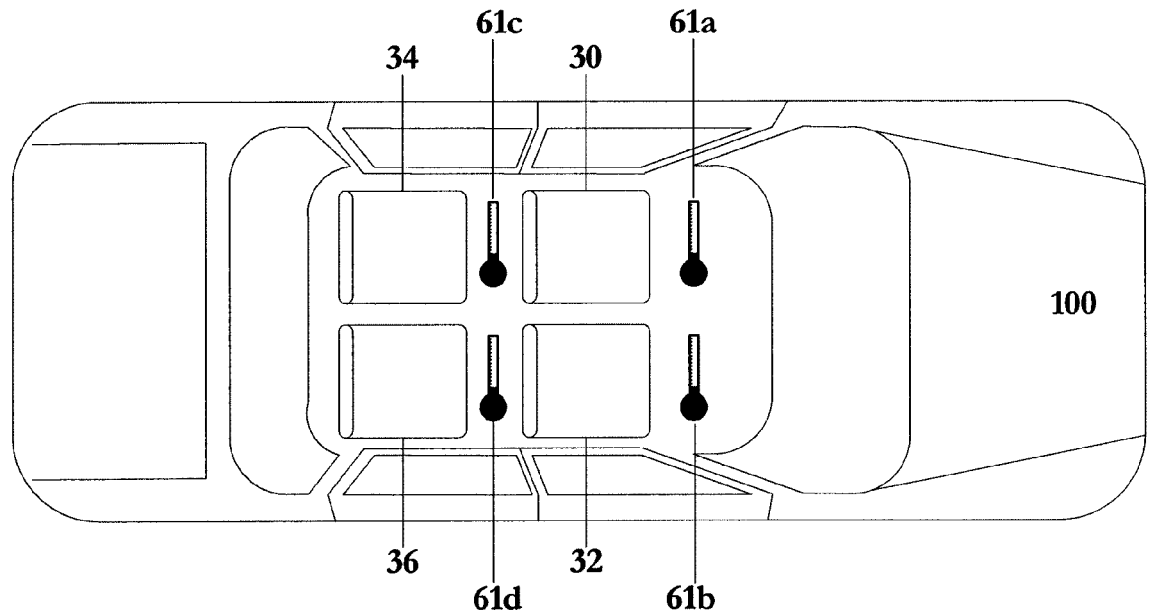
FIGS. 4a and 4b illustrate a climate control system of a vehicle in accordance with an exemplary aspect of the disclosure.
Figure 4B:
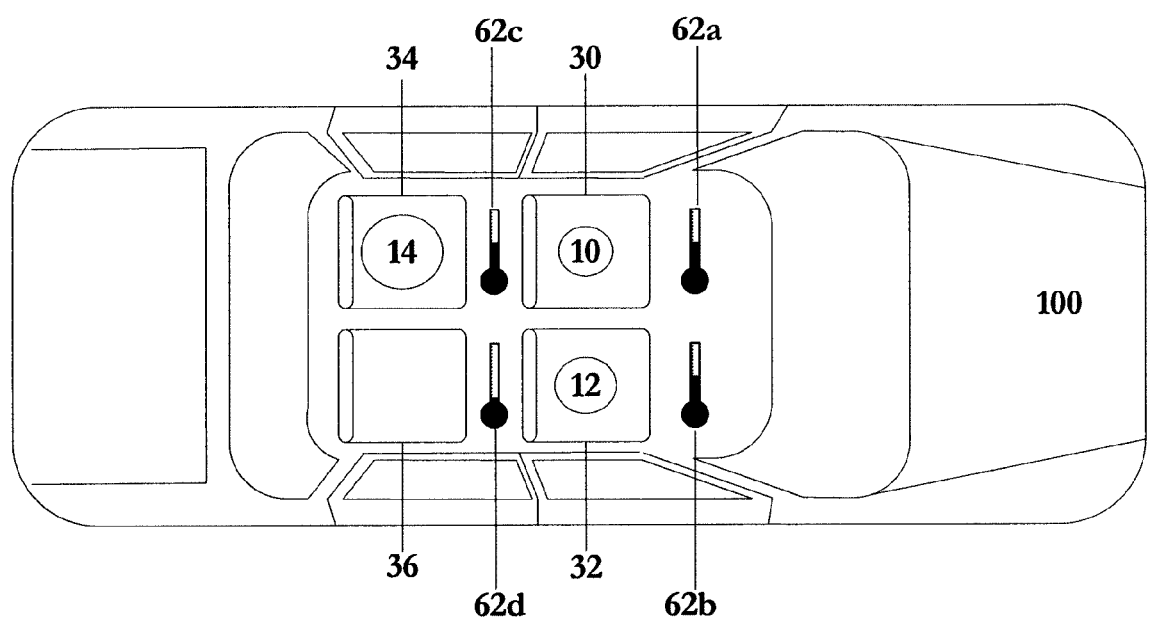

The system can also be utilized to optimize climate control in order to improve vehicle occupant comfort while also mitigating energy losses. FIGS. 4a and 4b illustrate a climate control system of the vehicle 100 in accordance with an exemplary aspect of the present disclosure. The thermometers 61a, 61b, 61c and 61d in FIG. 4a represent the temperature in different temperature zones of the vehicle 100 when there are no occupants in the vehicle 100. The thermometers 62a, 62b, 62c and 62d in FIG. 4b represent the temperature in different temperature zones of the vehicle 100 when vehicle occupants 10, 12 and 14 are respectively seated in vehicle seats 30, 32 and 34 of the vehicle 100.

As illustrated in FIG. 4a, when no vehicle occupants are present in the vehicle, each one of the temperature zones is maintained at the same level. In FIG. 4b, vehicle occupants 10, 12 and 14 are respectively positioned at seats 30, 32 and 34. The system detects the location and body dimensions of vehicle occupants 10, 12 and 14, and then performs at least one of the above noted estimations (occupant body-volume, occupant pose, occupant dynamics, etc.). The climate control system of the vehicle 100 is then adjusted to optimize, for example, the temperature distribution in the vehicle 100. For example, as can be seen in FIG. 4b, the temperature in zone 62d, which does not include a vehicle occupant, is not increased. Thus, the climate control system of the vehicle 100 can operate with a greater level of energy efficiency.

Although not illustrated, the body-volume information obtained from the system can also be used to detect and distinguish inanimate objects from vehicle occupants in order to deploy an airbag system efficiently. In another example, the detected information can be used to identify whether a vehicle occupant is currently positioned such that the airbag system cannot be operated safely. For example, the system can detect whether a vehicle occupant is holding an infant in their arms. The system can then alter the airbag deployment system based on this detected information so as to reduce potential injury to all the vehicle occupants. In a further example, occupant information determined by the system can be used to automatically adjust seat alignment or to position restraints such as seat belts.

The system according to the present disclosure can be trained with prior information on how to adjust various vehicle systems based on various body-pose and body-volume parameters. The system can also learn after its deployment in the vehicle by comparing its estimates of the occupant weight from data provided by the camera with actual weight of the occupant provided by a contact sensor, such as a weight sensor. The present system can also act as a redundant sensor for an airbag management system which detects passengers and classifies humans from inanimate objects for efficient airbag deployment. Even if the vehicle is equipped with the weight sensor, the vision-based system not only supplements the weight sensor (in case it fails) but can also detect precarious poses of the occupant for which the airbag deployment process should be changed from the standard process—something that the weight sensor alone cannot provide.

The present system does not only identify the presence or absence of a vehicle occupant in a particular location in the vehicle, but also determines more discrete information regarding the vehicle occupant. This discrete information reaches beyond basic information such as determining whether the vehicle occupant is leaning forward. In particular, the present system detects numerous elements of the human body and quantifies their location and orientation in space as well as their velocity and acceleration. These body dynamics and pose information can be used to appropriately adjust vehicle safety systems, such as an airbag deployment system, as well as determine whether a vehicle occupant is awake or asleep. For example, sound distribution of an in-vehicle sound system can be modified such that a sleeping passenger is not disturbed when a vehicle operator modifies the volume of the stereo system. The vehicle parameters used to adjust the various systems can be based on prior knowledge of an occupant (for example, the sleep state and wake state of a vehicle occupant), but may also be based on a continuously learned behavior based on the operation of the vehicle.

II. Hardware

Figure 5:
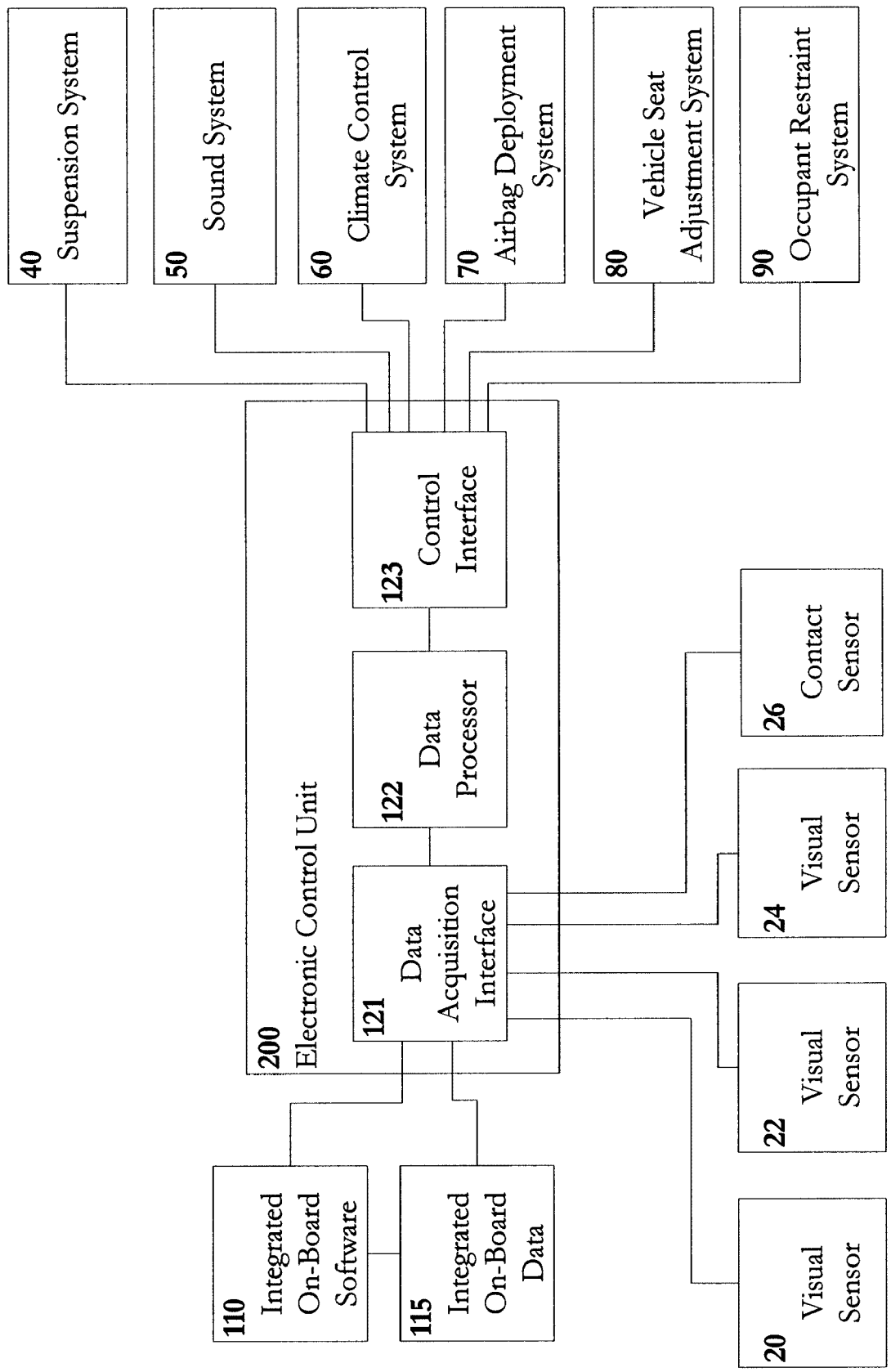
FIG. 5 illustrates a high level block diagram of a control system in accordance with an exemplary aspect of the disclosure.

FIG. 5 illustrates an electronic control system in accordance with an exemplary aspect of the disclosure. The electronic control system includes an electronic control unit 200. Electronic control unit 200 includes a data acquisition interface 121, a data processor 122 and a control interface 123. The electronic control unit may be located in an engine control unit or may be a stand alone device within another portion of the vehicle. The data acquisition interface 121 may employ, for example, wireless or hard wired connections. The data acquisition interface may be operably connected to any number or combination of vehicle mounted sensors such as, the visual sensors 20, 22, 24 and a contact sensor 26. The data acquisition interface 121 is configured to send the acquired data to a data processor 122.

The data processor 122 may be any component known to those skilled in the art that interprets and executes an instruction set. For example, the data processor 122 may be a AMD EPSILON 64®, a multicore processor, a dedicated application specific integrated circuit (ASIC), a programmable logic device (PLD) or even discrete logic components. The data processor 122 includes an algorithm that estimates the three dimensional location and orientation of the body parts of the vehicle occupants as well as their dynamics (velocity and acceleration). The algorithm can also estimate passenger occupancy, body-pose and body-volume information. The data processor 122 is configured to send commands to the control interface 123. The control interface 123 communicates instructions to a variety of vehicle systems. For example, a vehicle suspension system 40, a sound system 50, a climate control system 60, an airbag deployment system 70, a vehicle seat adjustment system 80 and an occupant restraint system 90. In addition, the control interface 123 may communicate with and control other systems in addition to those illustrated in FIG. 5.

Although the connections between various elements depicted in FIG. 5 are shown as hardwired implementations, these connections are equally applicable to wireless implementations. In addition, although FIG. 5 depicts three visual sensors 20, 22 and 24, the system according to the present invention can employ any number of visual sensors. Likewise, although FIG. 5 illustrates a single contact sensor 26, the system according to the present invention can include a single contact sensor, plural contact sensors or no contact sensors. In addition, as would be readily understood by one of ordinary skill in the art, the data acquisition interface can receive information from sensors in addition to the sensors illustrated in FIG. 5.

FIG. 5 also depicts integrated on-board software 110 and integrated on-board data 115. Although these elements are shown outside of the electronic control unit 200, they may also be incorporated in the electronic control unit 200. The on-board data 115 may be, for example, stored information regarding occupant classifications, system control metrics, detailed maps that correlate estimated occupant information, such as occupant body-volumes and poses, to specific control values for vehicle systems.

III. Methodology

A methodology of adapting a vehicle system will now be explained with reference to FIG. 6. At step 601, a visual sensor detects a three dimensional profile of a vehicle occupant. For example, at least one of the visual sensors 20, 22 and 24 illustrated in FIG. 1 detects a three dimensional profile of at least one of vehicle occupants 10, 12, and 14. At step 602, the occupant information is determined from the profile detected by the visual sensor. In particular, three dimensional locations and orientations of a plurality of body parts of the occupant of vehicle are determined based on the three dimensional profile detected by the visual sensor. At step 603, the three dimensional locations and orientations are analyzed to determine whether it is necessary to adjust a vehicle system. If no adjustment is required, the system returns to step 601 and the process is repeated. If adjustment is required, the appropriate vehicle system is adjusted at step 604.

Figure 7:
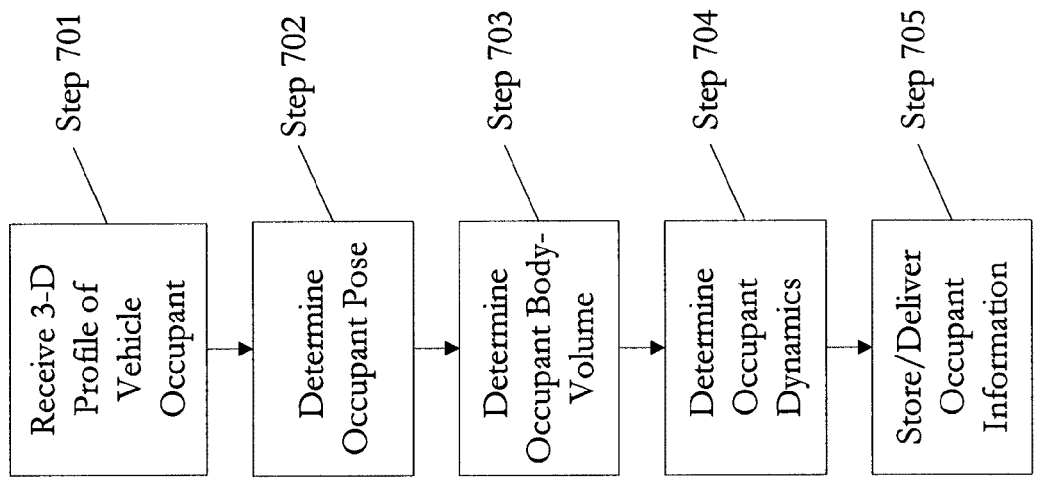
FIG. 7 is a flow chart of a methodology for determining occupant information in accordance with an exemplary aspect of the disclosure.
Figure 6:
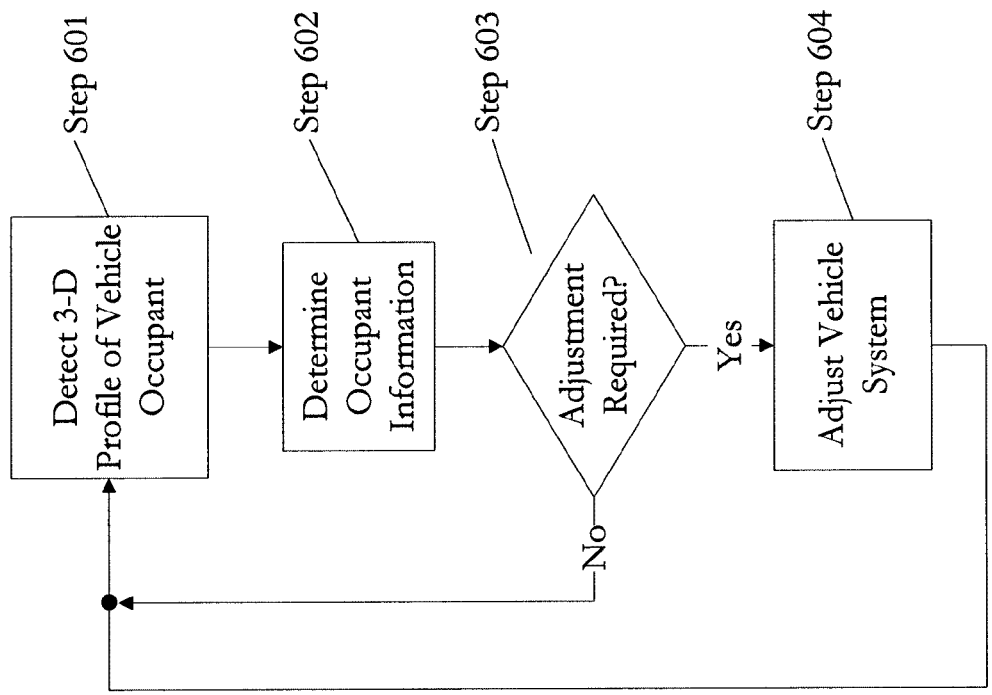
FIG. 6 is a flow chart of a methodology in accordance with an exemplary aspect of the disclosure.

FIG. 7 illustrates how the occupant information determination is performed in step 602 of FIG. 6 in more detail. At step 701, a visual sensor receives a three dimensional profile of a vehicle occupant. At step 702, the occupant's pose is determined based on the three dimensional location and orientation of the body parts of the vehicle occupant. In addition, at step 703, the occupant's body-volume is determined. At step 704, the dynamics (velocity/acceleration) of the occupant is determined. At step 705, the occupant information that has been determined is stored and/or delivered to the data processor.

Figure 8:
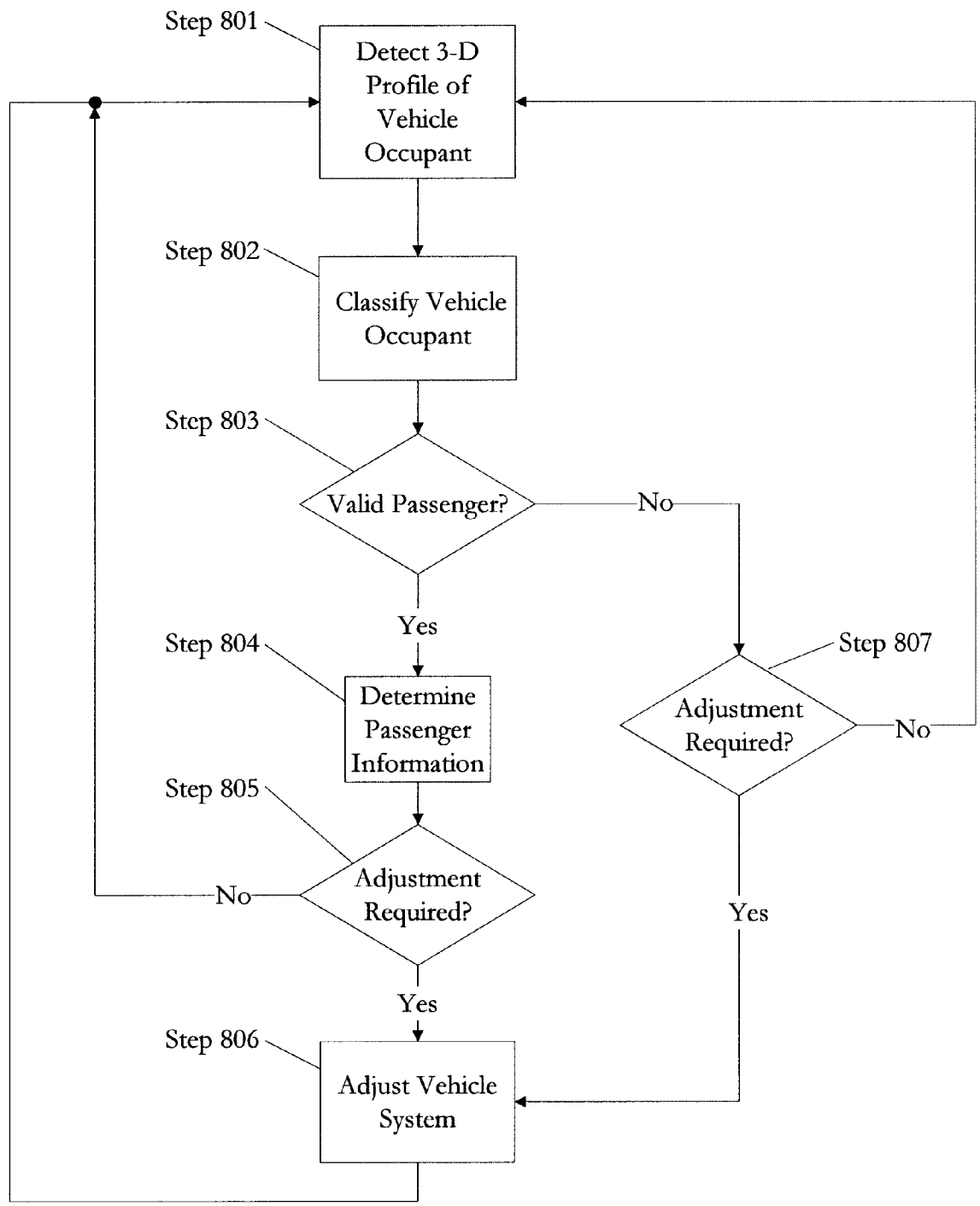
FIG. 8 is a flow chart of another methodology in accordance with an exemplary aspect of the disclosure.

The example methodology illustrated in FIG. 8 is similar to the methodology illustrated in FIG. 6, except the methodology in FIG. 8 additionally classifies a vehicle occupant to determine whether the vehicle occupant meets a predetermined criterion for adjusting a vehicle system. At step 801, the electronic control system detects a 3-D profile of a vehicle occupant. At step 802, the vehicle occupant is classified. For example, based on the 3-D location/information of the vehicle occupant, it is possible to determine whether the vehicle occupant is an inanimate object or a vehicle occupant. At step 803, the electronic control system determines whether the vehicle occupant is a valid passenger based on the classification performed in step 802. For example, if the vehicle occupant is categorized as an inanimate object, the safety control systems such as airbag deployment will be operated differently. If it is determined at step 803 that the vehicle occupant is a valid passenger, the passenger information is determined at step 804. At step 805, the electronic control system determines whether it is required to adjust a vehicle system.

If it is determined that vehicle system adjustment is required, the vehicle system adjustment is performed at step 806. If it is determined that an adjustment is not required, the process starts over at step 801. If it is determined at 803 that the vehicle occupant is not a valid passenger, step 807 determines whether it is required to adjust the vehicle system. If an adjustment is required, the appropriate vehicle system is adjusted at step 806. If an adjustment is not required, the method is repeated beginning at step 801.

In each of the described methodologies, a system may initiate once the vehicle 100 is turned on and continue until the vehicle 100 is turned off. However, the described methodologies are not so limited, and may be initiated and terminated manually by a vehicle operator, or on the basis of further inputs provided by other vehicle systems.

Figure 9:
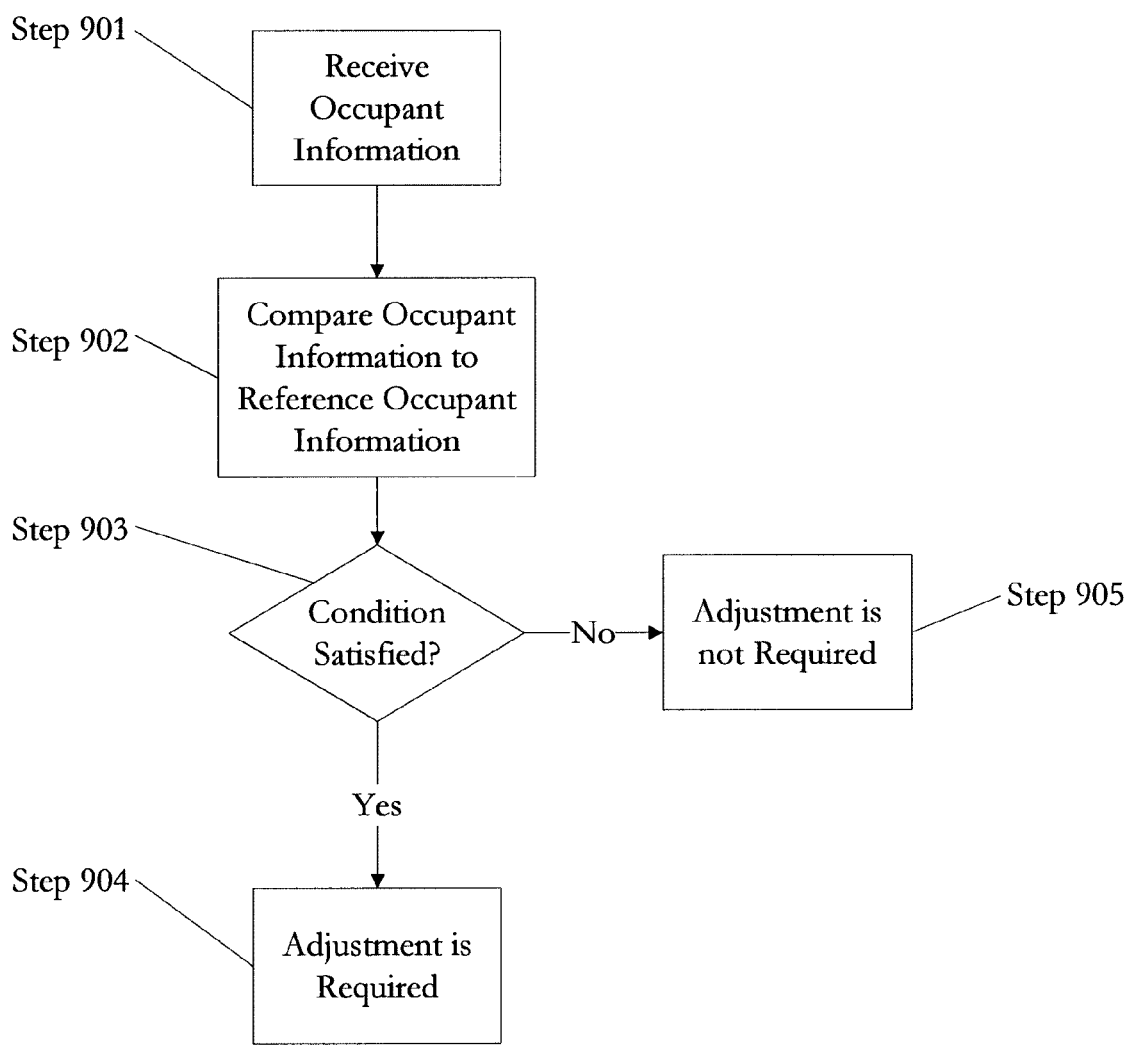
FIG. 9 is a flow chart of a methodology for determining whether a vehicle system requires adjustment in accordance with an exemplary aspect of the disclosure.

FIG. 9 illustrates further details of the determination performed by the electronic control system as to whether adjustment of a vehicle system is required. At step 901, the system processor receives the occupant information. At step 902, the occupant information is compared to reference occupant information. For example, the reference occupant information can be information stored in advance regarding occupant pose or body-volume information and corresponding control values performed by the vehicle system. In addition, the reference occupant information can be information that is newly stored based on learning values obtained through continuous use of the system. At step 903, the system processor determines whether a condition has been satisfied. For example, a system processor can determine whether the difference between the occupant information and the reference occupant information exceeds a predetermined threshold.

In another example, the occupant information can be categorized based on a comparison to a plurality of reference occupant information values. The system processor can then determine whether an adjustment is required based on which reference occupant information the detected occupant information is matched with.

Moreover, the present methodology is not limited to threshold comparisons or matching comparisons but may be used to continuously adjust vehicle system control values. Such continuous adjustment can include time delay values that limit the frequency of implementation of adjustments made to vehicle systems in order to facilitate vehicle occupant comfort. Such a feature can prevent, for example, the volume of a sound system from continuously changing due to a particularly active vehicle occupant.

If step 903 determines that a condition is not satisfied, step 905 returns a value indicating that adjustment is not required. If step 903 determines that the condition is satisfied, step 904 returns a value indicating that adjustment is required.

Figure 10:
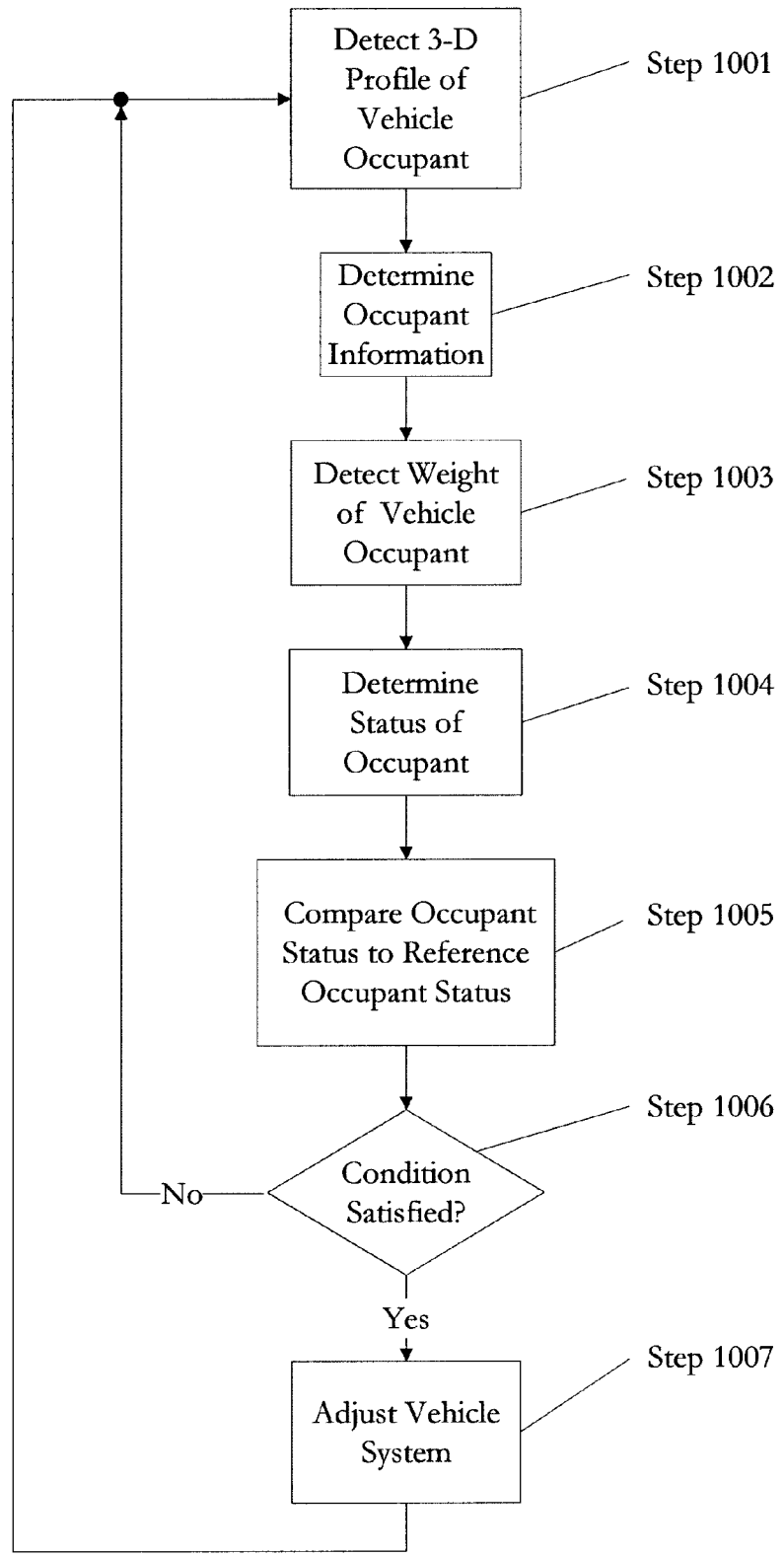
FIG. 10 is a flow chart of another methodology in accordance with an exemplary aspect of the disclosure.

FIG. 10 illustrates an exemplary methodology that incorporates information provided by a contact sensor, such as contact sensor 26 illustrated in FIG. 5. In step 1001, the three dimensional profile of a vehicle occupant is detected by, for example, at least one of the visual sensors 20, 22 and 24. At step 1002, the occupant information is determined. The occupant information can be any or all of the occupant information that are determined at steps 702, 703, and step 704 in FIG. 7. At step 1003, the occupant weight is detected by the contact sensor 26. At step 1004, the status of the occupant is determined based on the occupant information determined at step 1002 and the occupant weight determined at step 1003. For example, the present methodology can distinguish between a portly vehicle occupant that appears to have the same body-volume as a light weight occupant who is wearing a large coat. In step 1005, the occupant status is compared to a reference occupant status in order to accurately classify the vehicle occupant. Step 1006 determines whether a condition is satisfied based on the classification of the vehicle occupant. For example, step 1006 can determine it is not necessary to increase the temperature for the light weight occupant who is wearing the large coat. If the condition is not satisfied, the method is repeated starting with step 1001. If the condition is satisfied, the vehicle system is adjusted at step 1007.

Obviously, numerous modifications and variations of the present invention are possible in light of the above teachings. It is therefore to be understood that within the scope of the appended claims, the invention may be practiced otherwise than as specifically described herein.

The invention claimed is:

1. An electronic control system for adapting a vehicle system, comprising:
    a visual sensor that detects a three dimensional profile of an occupant of a vehicle;
    an electronic control unit configured to determine three dimensional locations and orientations of a plurality of body parts of the occupant of the vehicle based on the three dimensional profile detected by the visual sensor, and configured to adapt a vehicle system based on the determined three dimensional locations and orientations,
    wherein said electronic control unit is configured to determine a body-volume of the occupant of the vehicle based on the three dimensional profile of the occupant of the vehicle detected by the visual sensor.

2. The electronic control system according to claim 1, wherein the vehicle system is a suspension system, and wherein the electronic control unit is configured to adapt the suspension system based on the determined body-volume of the occupant of the vehicle.

3. The electronic control system according to claim 1, further comprising a contact sensor that detects a weight of the occupant of the vehicle.

4. The electronic control system according to claim 3,
    wherein the engine control unit is configured to determine a status of the occupant of the vehicle based on the body-volume of the occupant of the vehicle determined by the engine control unit and the weight of the occupant of the vehicle detected by the contact sensor,
    wherein the electronic control unit is configured to compare the status of the occupant of the vehicle to a reference occupant status, and
    wherein the electronic control unit is configured to adapt the vehicle system based on whether the comparison between the status of the occupant of the vehicle and the reference occupant status satisfies a predetermined condition.

5. The electronic control system according to claim 1, wherein the vehicle system is an airbag deployment system.

6. The electronic control system according to claim 1, wherein the vehicle system is an in-vehicle sound-system, and wherein adapting the vehicle system includes adjusting sound distribution within the vehicle.

7. The electronic control system according to claim 1, wherein the vehicle system is a climate control system, and wherein adapting the vehicle system includes adjusting temperature distribution within the vehicle.

8. The electronic control system according to claim 1, wherein the vehicle system is a vehicle seat adjustment system or a vehicle occupant restraint adjustment system, and wherein adapting the vehicle system includes adjusting a vehicle seat or a vehicle occupant restraint.

9. The electronic control system according to claim 1, wherein the visual sensor is a three dimensional time of flight camera.

10. An electronic control system for adapting a vehicle system, comprising:
a visual sensor that detects a three dimensional profile of an occupant of a vehicle;
an electronic control unit configured to determine three dimensional locations and orientations of a plurality of body parts of the occupant of the vehicle based on the three dimensional profile detected by the visual sensor, and configured to adapt a vehicle system based on the determined three dimensional locations and orientations,
wherein said electronic control unit is configured to determine a velocity or acceleration of at least one of the plurality of body parts of the occupant of the vehicle based on the three dimensional profile of the occupant of the vehicle detected by the visual sensor, and
wherein said electronic control unit is configured to adapt the vehicle system based on the determined velocity or acceleration of the at least one of the plurality of body parts of the occupant of the vehicle.

11. A method for adapting a vehicle system, comprising:
detecting a three dimensional profile of an occupant of a vehicle with a visual sensor;
determining three dimensional locations and orientations of a plurality of body parts of the occupant of the vehicle based on the three dimensional profile detected by the visual sensor;
adapting a vehicle system based on the determined three dimensional locations and orientations of the plurality of body parts of the occupant of the vehicle; and
determining a body-volume of the occupant of the vehicle based on the three dimensional profile of the occupant of the vehicle detected by the visual sensor.

12. The method according to claim 11, wherein the vehicle system is a suspension system, and wherein the adapting the vehicle system includes adapting the suspension system based on the determined body-volume of the occupant of the vehicle.

13. The method according to claim 11, further comprising:
detecting a weight of the occupant of the vehicle;
determining a status of the occupant of the vehicle based on the body-volume of the occupant of the vehicle determined by the engine control unit and the weight of the occupant of the vehicle;
comparing the status of the occupant of the vehicle to a reference occupant status; and
adapting the vehicle system based on whether the comparison between the status of the occupant of the vehicle and the reference occupant status satisfies a predetermined condition.

14. A method for adapting a vehicle system, comprising:
detecting a three dimensional profile of an occupant of a vehicle with a visual sensor;
determining three dimensional locations and orientations of a plurality of body parts of the occupant of the vehicle based on the three dimensional profile detected by the visual sensor;
adapting a vehicle system based on the determined three dimensional locations and orientations of the plurality of body parts of the occupant of the vehicle;
determining a velocity or acceleration of at least one of the plurality of body parts of the occupant of the vehicle based on the three dimensional profile of the occupant of the vehicle detected by the visual sensor; and
adapting the vehicle system based on the determined velocity or acceleration of the at least one of the plurality of body parts of the occupant of the vehicle.

15. An electronic control unit for adapting a vehicle system, comprising:
a data acquisition interface configured to receive a three dimensional profile of an occupant of a vehicle;
a data processor configured to determine three dimensional locations and orientations of a plurality of body parts of the occupant of the vehicle based on the three dimensional profile; and
a control interface configured to send signals that adapt a vehicle system based on the determined three dimensional locations and orientations,
wherein said data processor is configured to determine a body-volume of the occupant of the vehicle based on the three dimensional profile of the occupant of the vehicle.

16. The electronic control unit according to claim 15, wherein said data processor is configured to determine a status of the occupant of the vehicle based on the body-volume of the occupant of the vehicle determined by the engine control unit and a weight of the occupant of the vehicle detected by a contact sensor,
wherein said data processor unit is configured to compare the status of the occupant of the vehicle to a reference occupant status, and
wherein said data processor is configured to adapt the vehicle system based on whether the comparison between the status of the occupant of the vehicle and the reference occupant status satisfies a predetermined condition.

17. An electronic control unit for adapting a vehicle system, comprising:
a data acquisition interface configured to receive a three dimensional profile of an occupant of a vehicle;
a data processor configured to determine three dimensional locations and orientations of a plurality of body parts of the occupant of the vehicle based on the three dimensional profile; and
a control interface configured to send signals that adapt a vehicle system based on the determined three dimensional locations and orientations,
wherein said data processor is configured to determine a velocity or acceleration of at least one of the plurality of body parts of the occupant of the vehicle based on the three dimensional profile of the occupant of the vehicle, and
wherein said control interface is configured to adapt the vehicle system based on the determined velocity or acceleration of the at least one of the plurality of body parts of the occupant of the vehicle.

* * * * *